United States Patent
Ramachandra et al.

(10) Patent No.: US 12,432,616 B2
(45) Date of Patent: Sep. 30, 2025

(54) RADIO NETWORK NODE, NETWORK NODE, AND METHODS PERFORMED IN A WIRELESS COMMUNICATION NETWORK

(71) Applicant: Telefonaktiebolaget LM Ericsson (publ), Stockholm (SE)

(72) Inventors: Pradeepa Ramachandra, Linköping (SE); Sakib Bin Redhwan, Linköping (SE); Angelo Centonza, Granada (ES); Marco Belleschi, Solna (SE); Panagiotis Saltsidis, Stockholm (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 354 days.

(21) Appl. No.: 18/031,452

(22) PCT Filed: Oct. 22, 2021

(86) PCT No.: PCT/SE2021/051059
§ 371 (c)(1),
(2) Date: Apr. 12, 2023

(87) PCT Pub. No.: WO2022/086424
PCT Pub. Date: Apr. 28, 2022

(65) Prior Publication Data
US 2023/0388853 A1 Nov. 30, 2023

Related U.S. Application Data

(60) Provisional application No. 63/104,013, filed on Oct. 22, 2020.

(51) Int. Cl.
H04W 28/082 (2023.01)
H04W 28/08 (2023.01)
H04W 76/15 (2018.01)

(52) U.S. Cl.
CPC ......... *H04W 28/082* (2023.05); *H04W 28/08* (2013.01); *H04W 76/15* (2018.02)

(58) Field of Classification Search
None
See application file for complete search history.

(56) References Cited

U.S. PATENT DOCUMENTS 10,240,936 B1 * 3/2019 Md Saad ............ G01C 21/3407
2019/0349139 A1 * 11/2019 Park ..................... H04L 1/189

(Continued)

OTHER PUBLICATIONS

Report for [AT109e][805][SON/MDT]L2 open issues (CMCC), 3GPP TSG-RAN WG2 Meeting #109 electronic; R2-2001993, Feb. 24-Mar. 6, 2020, pp. 1-24. (Year: 2020).*

(Continued)

*Primary Examiner* — Mariela Vidal Carpio
(74) *Attorney, Agent, or Firm* — Murphy, Bilak & Homiller, PLLC

(57) ABSTRACT

Embodiments herein relate to a method performed by a network node for handling communication in a wireless communication network comprising a first radio network node and a second radio network node providing dual connectivity to a UE (10). The network node calculates an average delay of a packet transmission, wherein weighting is applied to a number of packets respectively sent via the first radio network node and the second radio network node when no packet duplication is applied, and wherein weighting is further applied for a respective delay calculation for one or more periods or packets with duplication, and the periods or packets without duplication.

15 Claims, 11 Drawing Sheets

(56) References Cited

U.S. PATENT DOCUMENTS

| | | | |
|---|---|---|---|
| 2020/0314862 A1 | 10/2020 | Wu | |
| 2020/0359356 A1* | 11/2020 | Sirotkin | H04L 1/1685 |
| 2021/0297905 A1* | 9/2021 | Zhang | H04W 28/0263 |
| 2022/0052956 A1* | 2/2022 | Hu | H04B 17/364 |
| 2022/0159513 A1* | 5/2022 | Jung | H04W 28/10 |
| 2022/0278904 A1* | 9/2022 | Zhou | H04L 41/0894 |
| 2022/0407621 A1* | 12/2022 | Laselva | H04W 76/15 |
| 2023/0060749 A1* | 3/2023 | Kang | H04W 28/04 |

OTHER PUBLICATIONS

"3GPP TS 28.552 V17.0.0", 3rd Generation Partnership Project; Technical Specification Group Services and System Aspects; Management and orchestration; 5G performance measurements (Release 17), Sep. 2020, pp. 1-207.

"3GPP TS 38.314 V16.1.0", 3rd Generation Partnership Project; Technical Specification Group Radio Access Network; NR; Layer 2 Measurements; (Release 16), Sep. 2020, pp. 1-18.

"3GPP TS 38.321 V16.2.0", 3rd Generation Partnership Project; Technical Specification Group Radio Access Network; NR; Medium Access Control (MAC) protocol specification (Release 16), Sep. 2020, pp. 1-107.

"3GPP TS 38.300 V15.2.0", 3rd Generation Partnership Project; Technical Specification Group Radio Access Network; NR; NR and NG-RAN Overall Description; Stage 2 (Release 15), Jun. 2018, pp. 1-87.

"3GPP TS 38.215 V16.1.0", 3rd Generation Partnership Project; Technical Specification Group Radio Access Network; NR; Physical layer measurements (Release 16), Mar. 2020, pp. 1-22.

"Discussion on MDT enhancements", 3GPP TSG-RAN WG2 Meeting #111 electronic, R2-2007770, Huawei, HiSilicon, Online, Aug. 17-28, 2020, pp. 1-7.

"Report for [AT109e][805][SON/MDT]L2 open issues (CMCC)", 3GPP TSG-RAN WG2 Meeting #109 electronic; R2-2001993, Feb. 24-Mar. 6, 2020, pp. 1-24.

"3GPP TS 37.320 V16.1.0", Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16), 3rd Generation Partnership Project; Technical Specification Group Radio Access Network, Jul. 2020, pp. 1-33.

"3GPP TS 38.213 V16.3.0", 3rd Generation Partnership Project; Technical Specification Group Radio Access Network; NR; Physical layer procedures for control (Release 16), Sep. 2020, pp. 1-179.

"3GPP TS 38.401 V15.4.0", 3rd Generation Partnership Project; Technical Specification Group Radio Access Network; NG-RAN; Architecture description (Release 15), Dec. 2018, pp. 1-40.

"3GPP TS 38.331 V16.2.0", 3rd Generation Partnership Project; Technical Specification Group Radio Access Network; NR; Radio Resource Control (RRC) protocol specification (Release 16), Sep. 2020, pp. 1-921.

"3GPP TS 23.501 V16.6.0", 3rd Generation Partnership Project; Technical Specification Group Services and System Aspects; System architecture for the 5G System (5GS); Stage 2 (Release 16), Sep. 2020, pp. 1-447.

Ramaswamy, Venkatesh, et al., "Modeling and Analysis of Multi-RAT Dual Connectivity Operations in 5G Networks", 2019 IEEE 2nd 5G World Forum, IEEE Xplore, Sep. 30, 2019, pp. 1-6.

* cited by examiner

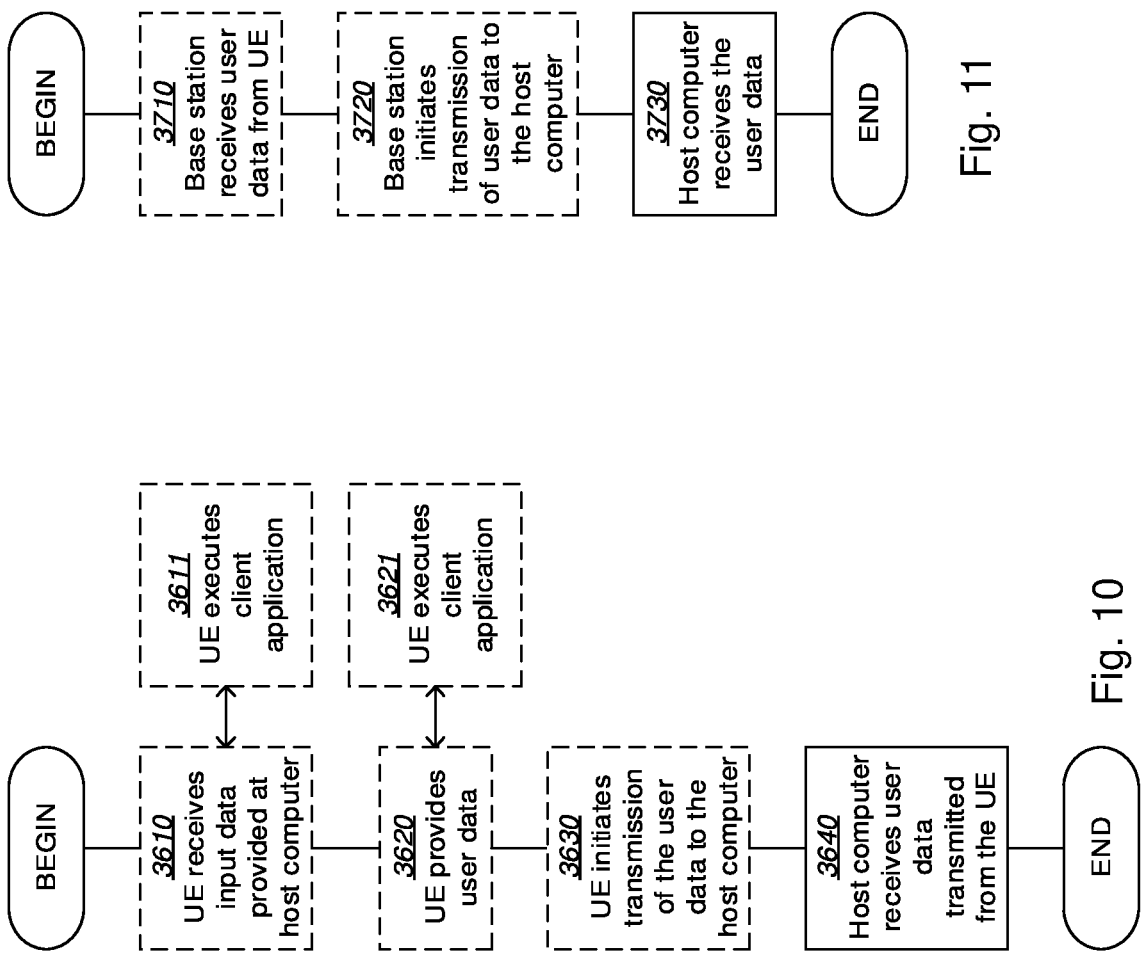

RADIO NETWORK NODE, NETWORK NODE, AND METHODS PERFORMED IN A WIRELESS COMMUNICATION NETWORK

TECHNICAL FIELD

Embodiments herein relate to a radio network node, a network node and methods performed therein regarding wireless communication. Furthermore, a computer program product and a computer-readable storage medium are also provided herein. Especially, embodiments herein relate to handling communication, e.g., calculating delays, in a wireless communication network.

BACKGROUND

In a typical wireless communication network, UEs, also known as wireless communication devices, mobile stations, stations (STA) and/or wireless devices, communicate via a Radio access Network (RAN) to one or more core networks (CN). The RAN covers a geographical area which is divided into service areas or cell areas, with each service area or cell area being served by network node such as an access node e.g. a Wi-Fi access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the wireless devices within range of the access node. The radio network node communicates over a downlink (DL) to the wireless device and the wireless device communicates over an uplink (UL) to the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases (Rel), such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies also known as new radio NR, the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Carrier Aggregation (CA) is generally used in NR (5G) and LTE systems to improve UE transmit receive data rate. With carrier aggregation, the UE typically operates initially on single serving cell called a primary cell (Pcell). The Pcell is operated on a component carrier in a frequency band. The UE is then configured by the network with one or more secondary cell (SCell) or secondary serving cells (Scell(s)). Each Scell can correspond to a component carrier (CC) in the same frequency band (intra-band CA) or different frequency band (inter-band CA) from the frequency band of the CC corresponding to the Pcell. For the UE to transmit/receive data on the Scell(s) (e.g by receiving downlink-shared channel (DL-SCH) information on a physical downlink shared channel (PDSCH) or by transmitting uplink-shared channel (UL-SCH) on a physical uplink shared channel (PUSCH)), the Scell(s) need to be activated by the network. The Scell(s) may also be deactivated and later reactivated as needed via activation/deactivation signalling.

The current 5G RAN (NG-RAN) architecture is depicted and described in TS 38.401 v15.4.0 as follows.

FIG. 1 illustrates an Overall architecture.

The NG architecture can be further described as follows. The NG-RAN consists of a set of gNBs connected to the 5GC through the NG. An gNB can support FDD mode, TDD mode or dual mode operation. gNBs can be interconnected through the Xn interface. A gNB may consist of a gNB-central unit (CU) and gNB-distributed units (DU). A gNB-CU and a gNB-DU are connected via F1 logical interface. One gNB-DU is connected to only one gNB-CU. For resiliency, a gNB-DU may be connected to multiple gNB-CU by appropriate implementation. NG, Xn, and F1 are logical interfaces. The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1), the related TNL protocol and the functionality are specified. The TNL provides services for user plane transport and signalling transport.

A gNB may also be connected to an LTE eNB via the X2 interface. Another architectural option is that where an LTE eNB connected to the Evolved Packet Core network is connected over the X2 interface with a so called nr-gNB. The latter is a gNB not connected directly to a CN and connected via X2 to an eNB for the sole purpose of performing dual connectivity.

The architecture in FIG. 1 can be expanded by spitting the gNB-CU into two entities, such as one gNB-CU-UP, which serves the user plane and hosts the PDCP protocol, and one gNB-central unit-control plane (CU-CP), which serves the control plane and hosts the PDCP and RRC protocol. For completeness it should be said that a gNB-DU hosts the RLC/MAC/PHY protocols.

Immediate MDT

Immediate minimization drive test (MDT) is standardized so that the management systems can collect the key performance indicators (KPI) associated to a UE in the connected mode. The following excerpts from TS 37.320 v 16.1.0 provide some configuration and reporting of measurements in immediate MDT.

5.1.2 Immediate MDT Procedures
5.1.2.1 Measurement Configuration

For Immediate MDT, RAN measurements and UE measurements can be configured. The configuration for UE measurements is based on the existing RRC measurement procedures for configuration and reporting with some extensions for location information.

NOTE: No extensions related to time stamp are expected for Immediate MDT, i.e., time stamp is expected to be provided by eNB/RNC/gNB.

If area scope is included in the MDT configuration provided to the RAN, the UE is configured with respective measurement when the UE is connected to a cell that is part of the configured area scope.

5.1.2.2 Measurement Reporting

For Immediate MDT, the UE provides detailed location information, e.g., GNSS location information, if available. The UE also provides available neighbour cell measurement information that may be used to determine the UE location, a so called radio frequency (RF) fingerprint. E-UTRAN Cell Global Identifier (ECGI), Cell-Id, or Cell Identity of the serving cell when the measurement was taken is always assumed known in E-UTRAN, UTRAN, or NR respectively.

The location information which comes with UE radio measurements for MDT can be correlated with other MDT measurements, e.g., RAN measurements. For MDT measurements where UE location information is provided separately, it is assumed that the correlation of location information and MDT measurements should be done in a Trace Collection Entity (TCE) based on time stamps.

5.4.1 RRC_CONNECTED

In RRC_CONNECTED state, the UE supports Immediate MDT as described in 5.1.2. In order to support Immediate MDT, the existing RRC measurement configuration and reporting procedures apply. Some extensions are used to carry location information.

5.4.1.1 Measurements and Reporting Triggers for Immediate MDT

Measurements to be performed for Immediate MDT purposes involve reporting triggers and criteria utilized for radio resource management (RRM). In addition, there are associated network performance measurements performed in the gNB.

In particular, the following measurements shall be supported for Immediate MDT performance:

Measurements:
M1: DL signal quantities measurement results for the serving cell and for intra-frequency/Inter-frequency/inter-RAT neighbour cells, including cell/beam level measurement for NR cells only, TS 38.215 [19].

M2: Power Headroom measurement by UE, TS 38.213 [20].

M3: Received Interference Power measurement [The feasibility needs to be confirmed by RAN1].

M4: Data Volume measurement separately for DL and UL, per data radio bearer (DRB) per UE, see TS 28.552 [17].

M5: Average UE throughout measurement separately for DL and UL, per DRB per UE and per UE for the DL, per DRB per UE and per UE for the UL, by gNB, see TS 28.552 [17].

M6: Packet Delay measurement separately for DL and UL, per DRB per UE, TS 28.552 [17] and TS 38.314 [18].

M7: Packet loss rate measurement separately for DL and UL, per DRB per UE, TS 28.552 [17] and TS 38.314 [18].

M8: received signal strength indicator (RSSI) measurement by UE (for wireless local area network (WLAN)/Bluetooth measurement) see TS 38.331 [15].

M9: round trip time (RTT) Measurement by UE (for WLAN measurement) see TS 38.331 [15].

Measurement Collection Triggers:
For M1:
Event-triggered measurement reports according to existing RRM configuration for events A1, A2, A3, A4, A5, A6, B1 or B2.
Periodic, A2 event-triggered, or A2 event triggered periodic measurement report according to MDT specific measurement configuration.

For M2:
Reception of Power Headroom Report (PHR) according to existing RRM configuration.
NOTE: PHR is carried by MAC signalling. Thus, the existing mechanism of PHR transmission applies, see TS 38.321 [21].

For M3:
End of measurement collection period.
For M4:
End of measurement collection period.
For M5:
End of measurement collection period.
For M6:
End of measurement collection period.
For M7:
End of measurement collection period.
For M8:
End of measurement collection period.
For M9:
End of measurement collection period.

A Radio Link Failure (RLF) report contains information related to the latest connection failure experienced by the UE. The connection failure can be RLF or Handover Failure (HOF). The contents of the RLF report and the procedure for retrieving it by a gNB are specified in [TS 38.300].

NR RLF report content required for MDT includes:
Latest radio measurement results of the serving and neighbouring cells, including synchronization signal block (SSB)/CSI-RS index and associated measurements in the serving and neighbouring cells;
NOTE: The measure quantities are sorted through the same RS type depending on the availability, according to the following priority: reference signal received power (RSRP), reference signal received quality (RSRQ), signal to interference plus noise ratio (SINR).
WLAN and Bluetooth measurement results, if were configured prior RLF and are available for reporting;

"No suitable cell is found" flag when T311 expires;

Indication per SSB/CSI-RS beams reporting whether it is configured to RLM purpose;

Available sensor information;

Available detailed location information;

Random access channel (RACH) failure report (in case, the cause for RLF is random access problem or Beam Failure Recovery (BFR) failure);

Tried SSB index and number of Random Access Preambles transmitted for each tried SSB in chronological order of attempts;

Contention detected as per RACH attempt;

Indication whether the selected SSB is above or below the rsrp-ThresholdSSB threshold, as per RACH attempt;

Tracking Area Code (TAC) of the cell in which the UE performs the RA procedure;

Frequency location related information of the RA resources used by the UE as specified in TS 38.331 [15].

If detailed location information (e.g. Global Navigation Satellite Systems (GNSS) location information) is available, the reported location information in rlfReport consists of:

Latitude, longitude (mandatory);

Altitude (conditional on availability);

Velocity (conditional on availability);

Uncertainty (conditional on availability);

Confidence (conditional on availability);

Direction (conditional on availability).

If sensor information is available, the sensor information may convey uncompensated barometric pressure, UE speed, and UE orientation. RLF reports may also include available WLAN measurement results and/or Bluetooth measurement results for calculating UE location.

In addition, the RLF report may include additional information required for MRO solutions, as specified in TS [TS 38.300].

5.4.1.3 Immediate MDT for MR-DC

Immediate MDT is supported for E-UTRAN New Radio-Dual Connectivity (EN-DC) scenario.

In signalling based immediate MDT, network node such as a mobility management entity (MME) provides MDT configuration for both MN and SN towards MN including multi RAT SN configuration, specifically E-UTRA and NR MDT configuration. MN then forwards the NR MDT configuration towards SN. In an EN-DC scenario, the SN is always NR.

In management-based immediate MDT, OAM provides the MDT configuration to both MN and SN independently. For both MN and SN, Management based MDT should not overwrite signalling based MDT.

For immediate MDT configuration, MN and SN can independently configure and receive measurement from the UE.

RAN Delay.

The RAN internal delay can be split into multiple components, and they are captured in TS 38.314 specification. The following excerpts from TS 38.314 v 16.1.0 provide some details of these components that make up the RAN delay.

4.2.1.2 Packet Delay 4.2.1.2.1 General

Packet delay includes RAN part of delay and CN part of delay.

The RAN part of DL packet delay measurement comprises:

D1 (DL delay in over-the-air interface), referring to Average delay DL air-interface in TS 28.552 [2] 5.1.1.1.1.

D2 (DL delay on gNB-DU), referring to Average delay in radio link control (RLC) sublayer of gNB-DU in TS 28.552 [2] 5.1.3.3.3.

D3 (DL delay on F1-U), referring to Average delay on F1-U in TS 28.552 [2] 5.1.3.3.2.

D4 (DL delay in CU-user plane (UP)), referring to Average delay DL in CU-UP in TS 28.552 [2] 5.1.3.3.1.

The DL packet delay measurements, i.e. D1 (the DL delay in over-the-air interface), D2 (the DL delay in gNB-DU), D3 (the DL delay on F1-U), and D4 (the DL delay in CU-UP), should be measured per DRB per UE.

The RAN part (including UE) of UL packet delay measurement comprises:

D1 (UL Packet Data Convergence Protocol (PDCP) packet average delay, as defined in clause 4.3.1.1).

D2.1 (average over-the-air interface packet delay, as defined in 4.2.1.2.2).

D2.2 (average RLC packet delay, as defined in 4.2.1.2.3).

D2.3 (average delay UL on F1-U, it is measured using the same metric as the average delay DL on F1-U defined in TS 28.552 [2] clause 5.1.3.3.2).

D2.4 (average PDCP re-ordering delay, as defined in 4.2.1.2.4).

The UL packet delay measurements, i.e. D1 (UL PDCP packet average delay), D2.1 (average over-the-air interface packet delay), D2.2 (average RLC packet delay), D2.3 (average delay UL on F1-U), and D2.4 (average PDCP re-ordering delay), should be measured per DRB per UE. The unit of D1, D2.1, D2.2, D2.3 and D2.4 is 0.1 ms.

For non CU-DU split case, RAN part of packet delay excludes the delay at F1-U interface, i.e. D2.3 and D3.

For the quality of service (QoS) monitoring in TS 23.501 [4], RAN informs the RAN part of UL packet delay measurement, or the RAN part of DL packet delay measurement, or both to the CN.

4.2.1.2.2 Average Over-the-Air Interface Packet Delay in the UL Per DRB Per UE.

The objective of this measurement is to measure air interface UL packet delay for operation administration and maintenance (OAM) performance observability or for QoS verification of MDT or for the QoS monitoring as defined in TS 23.501 [4].

Protocol Layer: Medium Access Control (MAC)

TABLE 4.2.1.2.2-1

Definition for Average over-the-air packet delay in the UL per DRB per UE

| | |
|---|---|
| Definition | Average over-the-air packet delay in the UL per DRB per UE. This measurement is applicable for EN-DC and SA. This measurement refers to packet delay for DRBs. This measurement provides the average (arithmetic mean) time it takes to successfully receive a transport block from the time of UL transmission indicated in scheduling grant. Detailed Definition: $$M(T, drbid) = \left[ \frac{\sum_{\forall i} tSucc(i, drbid) - tSched(i, drbid)}{I(T)} \right],$$ where explanations can be found in the table 4.2.1.2.2-2 below. |

TABLE 4.2.1.2.2-2

Parameter description for Average over-the-air packet delay in the UL per DRB per UE

| | |
|---|---|
| M(T, drbid) | Over-the-air packet delay in the UL per DRB per UE, averaged during time period T. Unit: 0.1 ms. |
| tSched(i, drbid) | The point in time when the UL MAC SDU i is scheduled as per the scheduling grant provided. |
| tSucc(i, drbid) | The point in time when the MAC SDU i was received successfully by the network. |
| i | A MAC SDU that arrives at the MAC during time period T. |
| I(T) | Total number of MAC SDUs i. |
| T | Time Period during which the measurement is performed. |
| drbid | The identity of the measured DRB. |

4.2.1.2.3 Average RLC Packet Delay in the UL Per DRB Per UE

The objective of this measurement is to measure RLC delay in the UL for OAM performance observability or for QoS verification of MDT or for the QoS monitoring as defined in TS 23.501 [4].

Protocol Layer: RLC

TABLE 4.2.1.2.3-1

Definition for Average RLC packet delay in the UL per DRB per UE

| | |
|---|---|
| Definition | Average RLC delay in the UL per DRB per UE. This measurement is applicable for EN-DC and SA. This measurement refers to packet delay for DRBs. For CU-DU split scenario or DC scenario, this measurement refers to the RLC delay on each DU or RAN node. This measurement provides the average (arithmetic mean) time it takes from the RLC PDU including the first part of an RLC SDU is received to the RLC SDU is sent to PDCP or CU for split gNB.<br>Detailed Definition:<br>$$M(T, drbid) = \left[ \frac{\sum_{\forall i} tSent(i, drbid) - tReceiv(i, drbid)}{I(T)} \right],$$<br>where explanations can be found in the table 4.2.1.2.3-2 below. |

TABLE 4.2.1.2.3-2

Parameter description for Average RLC packet delay in the UL per DRB per UE

| | |
|---|---|
| M(T, drbid) | RLC delay in the UL per DRB per UE, averaged during time period T. Unit: 0.1 ms. |
| tReceiv(i, drbid) | The point in time when the RLC PDU including the first part of the RLC SDU i is received. |
| tSent(i, drbid) | The point in time when the RLC SDU i is sent to PDCP or CU for split gNB. |
| i | A RLC SDU that is received by the RLC during time period T. |
| I(T) | Total number of RLC SDUs i. |
| T | Time Period during which the measurement is performed. |
| drbid | The identity of the measured DRB. |

4.2.1.2.4 Average PDCP Re-Ordering Delay in the UL Per DRB Per UE

The objective of this measurement is to measure PDCP re-ordering delay in the UL for OAM performance observability or for QoS verification of MDT or for the QoS monitoring as defined in TS 23.501 [4].

Protocol Layer: PDCP

TABLE 4.2.1.2.4-1

Definition for Average PDCP re-ordering delay in the UL per DRB per UE

| | |
|---|---|
| Definition | Average PDCP re-ordering delay in the UL per DRB per UE. This measurement is applicable for EN-DC and SA. This measurement refers to packet delay for DRBs. This measurement provides the average (arithmetic mean) time it takes from the point a PDCP PDU is received to the PDCP SDU is sent to upper SAP.<br>Detailed Definition:<br>$$M(T, drbid) = \left[ \frac{\sum_{\forall i} tSent(i, drbid) - tReceiv(i, drbid)}{I(T)} \right],$$<br>where explanations can be found in the table 4.1.1.2.4-2 below. |

TABLE 4.2.1.2.4-2

Parameter description for Average PDCP re-ordering delay in the UL per DRB per UE

| | |
|---|---|
| M(T, drbid) | PDCP re-ordering delay in the UL per DRB per UE, averaged during time period T. Unit: 0.1 ms. |
| tReceiv(i, drbid) | The point in time when the PDCP PDU including the PDCP SDU i is received. |
| tSent(i, drbid) | The point in time when the PDCP SDU i is sent to upper SAP. |
| i | A PDCP SDU that is received by the PDCP during time period T. |
| I(T) | Total number of PDCP SDUs i. |
| T | Time Period during which the measurement is performed. |
| drbid | The identity of the measured DRB. |

Split Bearer Configuration.

When a split bearer is configured for a certain data bearer, the data associated to this bearer can be routed over two different RAN legs, e.g., LTE or NR in case of EN-dual connectivity (DC). The split takes place at the PDCP entity which is in charge of routing the packets to the RLC entities associated to the two different legs. The bearer split can be applicable both to DL and UL transmissions.

For the DL, the decision on which leg to select can depend on the radio conditions, e.g. Channel Quality Indicator (CQI) reports, SINR estimation, etc.

For the UL, the UE needs to be informed which leg it has to use. In order to do that, the network can provide a PDCP configuration indicating which is the primary path for the PDCP transmissions, and potentially also with a threshold on the buffer status, i.e., ul-DataSplitThreshold, determining whether the UE should use only the primary path for UL PDCP transmissions or both the primary and secondary path. In particular, if the total amount of PDCP data volume and RLC data volume pending for initial transmission in the two associated RLC entities is equal to or larger than ul-DataSplitThreshold, the UE can decide whether to submit the PDCP PDU to either the primary RLC entity or the secondary RLC entity.

```
PDCP-Config ::=            SEQUENCE {
    ...
    moreThanOneRLC         SEQUENCE {
        primaryPath        SEQUENCE {
            cellGroup          CellGroupId                OPTIONAL,
-- Need R
            logicalChannel     LogicalChannelIdentity
OPTIONAL -- Need R
        },
        ul-DataSplitThreshold  UL-DataSplitThreshold
OPTIONAL, -- Cond SplitBearer
        pdcp-Duplication       BOOLEAN
OPTIONAL -- Need R
        ...
    }
}
```

The MN and the SN can also exchange over the Xn the UL configuration of a certain radio bearer in a certain node.

| IE/Group Name | Presence | Range | IE type and reference | Semantics description |
|---|---|---|---|---|
| UL UE Configuration | M | | ENUMERATED (no-data, shared, only, . . . ) | Indicates how the UE uses the UL at the corresponding node. |

The UL configuration indicates whether, for a given node and DRB, the UE shall not transmit any data, or if data transmission is allowed in both DC nodes, or if UL transmission is only allowed in that node. For example, in case of SN terminated bearer, on the basis of the estimated UL SI NR, the SN may initiate an SN Modification Required indicating that the UE should only perform PDCP transmission in the NR leg.

Split bearer can also be adopted for DC PDCP duplication in which case duplication is applied to a PDCP packet. Duplicates are transmitted to the two different legs associated to the split bearer.

SUMMARY

As part of developing embodiments herein, the following issue or issues were identified. In the case of split bearer, one packet such as a DL PDCP packet can be sent only via a master node (MN) or only via a secondary node (SN) or via both in case also PDCP duplication is configured. In such a scenario, the total RAN delay experienced by the packet depends on whether the packet was sent via the MN, via the SN, or via both.

In document R2-2007770 "Discussion on MDT enhancements", Huawei, RAN2 111_e meeting, 17-28 Aug. 2020, it was proposed that the total RAN delay for split bearer deployment is computed separately for scenarios with duplication and scenarios without duplication. It is proposed that, for the PDCP duplication, the final delay is the minimum value of measured delays of two paths and for the non-duplication scenario, and the final delay is the average value of the measured results.

There are two issues associated to this proposed solution.
1) In the non-duplication scenario, if only 5% of the packets were sent via the MN DU and the rest 95% of the packets via the SN DU, then taking the simple average of MN delay and SN delay would result in unfairly biasing the average towards the MN side with 0.5 weightage, although only 5% of the packets were sent via MN DU.

2) It is unclear how the total average RAN delay is to be calculated in a scenario where the configuration changes between packet duplication and no packet duplication during the measurement period. The delay measurements would be computed during a duration of 'X' ms (this 'X' is configurable). Within this duration of 'X' ms, the duplication would, for example, have been enabled for the first 10% of the time and then for the next 80% of the time, the duplication is disabled and for the final 10% of the time the duplication is enabled.

An object of embodiments herein is to provide a mechanism that improves communication with a more reliable delay computation in the wireless communication network.

According to an aspect, the object is achieved by providing a method performed by a network node for handling communication in a wireless communication network comprising a first and a second radio network node providing dual connectivity to a UE. The network node calculates an average delay of packet transmission, wherein weighting is applied to the number of packets respectively sent via the first radio network node and the second radio network node when no packet duplication is applied. Furthermore, weighting is also applied for the respective delay calculation for the one or more periods or packets with duplication, and the periods or packets without duplication According to another aspect, the object is achieved by providing a method performed by a radio network node, e.g. the first or the second radio network node, for handling communication in a wireless communication network comprising a first and a second radio network node providing dual connectivity to a UE. The radio network node provides, to a network node, an indication indicating a delay and a number of packets sent via the radio network node when no packet duplication is applied over a first period, and/or another indication indicating a delay and a number of packets sent via the radio network node when duplication is applied over a second period. For example, the radio network node provides to a network node such as an OAM node, one of the radio network node or even the UE, an indication indicating a delay and/or number of packets sent via the radio network node when no packet duplication is applied.

According to still another aspect, the object is achieved by providing a network node and a radio network node configured to perform the methods herein.

Thus, it is herein provided a network node for handling communication in a wireless communication network comprising a first radio network node and a second radio network node providing dual connectivity to a UE. The network node is configured to calculate an average delay of a packet transmission, wherein weighting is applied to a number of packets respectively sent via the first radio network node and the second radio network node when no packet duplication is applied, and wherein weighting is further applied for a respective delay calculation for one or more packets and/or periods with duplication, and one or more packets and/or periods without duplication.

Further, it is herein provided a radio network node for handling communication in a wireless communication network comprising a first and a second radio network node providing dual connectivity to a UE. The radio network node is configured to provide to a network node, an indication indicating a delay and a number of packets sent via the radio network node when no packet duplication is applied over a first period, and/or another indication indicating a delay and a number of packets sent via the radio network node when duplication is applied over a second period.

It is furthermore provided herein a computer program product comprising instructions, which, when executed on at least one processor, cause the at least one processor to carry out any of the methods above, as performed by the radio network node and the network node, respectively. It is additionally provided herein a computer-readable storage medium, having stored thereon a computer program product comprising instructions which, when executed on at least one processor, cause the at least one processor to carry out any of the methods above, as performed by the network node and the radio network node, respectively.

It is herein disclosed a weighted averaging-based method to compute the total RAN delay for a given bearer in the split bearer scenario. The weighting is applied to the number of packets respectively sent via the first and second radio network node when no packet duplication is applied. Furthermore, to handle scenarios where the configuration changes between packet duplication and no packet duplication during the measurement period is applied, weighting is also applied for the respective delay calculation measurements/methods for the periods and/or packets with duplication and the periods and/or packets without duplication.

The weighted averaging method includes deriving weight for the delay calculated at the first radio network node and at the second network node, on the basis of at least one of the following.

1) Number of packets for a given bearer sent via the first radio network node and the number of packets sent via the second radio network node when the duplication was not enabled and delay experienced by the packets on the first radio network node and the second radio network node.

2) Number of packets for a given bearer sent via both first radio network node and second radio network node when the duplication was enabled and the delay experienced by the packets on the first radio network node and the second radio network node.

Embodiments herein provide a more accurate reflection of the average RAN delay experienced by the packets in the split bearer deployments for the entirety of the averaging duration. Thus, it is herein disclosed a solution that allows an accurate calculation of the RAN delay, resulting in an improved performance of the wireless communication network.

BRIEF DESCRIPTION OF THE DRAWINGS

Embodiments will now be described in more detail in relation to the enclosed drawings, in which:

FIGS. 8-11 are flowcharts illustrating methods implemented in a communication system including a host computer, a base station and a user equipment.

DETAILED DESCRIPTION

Embodiments herein are described within the context of 3GPP NR radio technology (3GPP TS 38.300 V15.2.0 (2018 June)). It is understood that the problems and solutions described herein are equally applicable to wireless access networks and user-equipments (UEs) implementing other access technologies and standards. NR is used as an example technology where embodiments are suitable, and using NR in the description therefore is particularly useful for understanding the problem and solutions solving the problem. In particular, embodiments are applicable also to 3GPP LTE, or 3GPP LTE and NR integration, also denoted as non-standalone NR.

Figure 1:
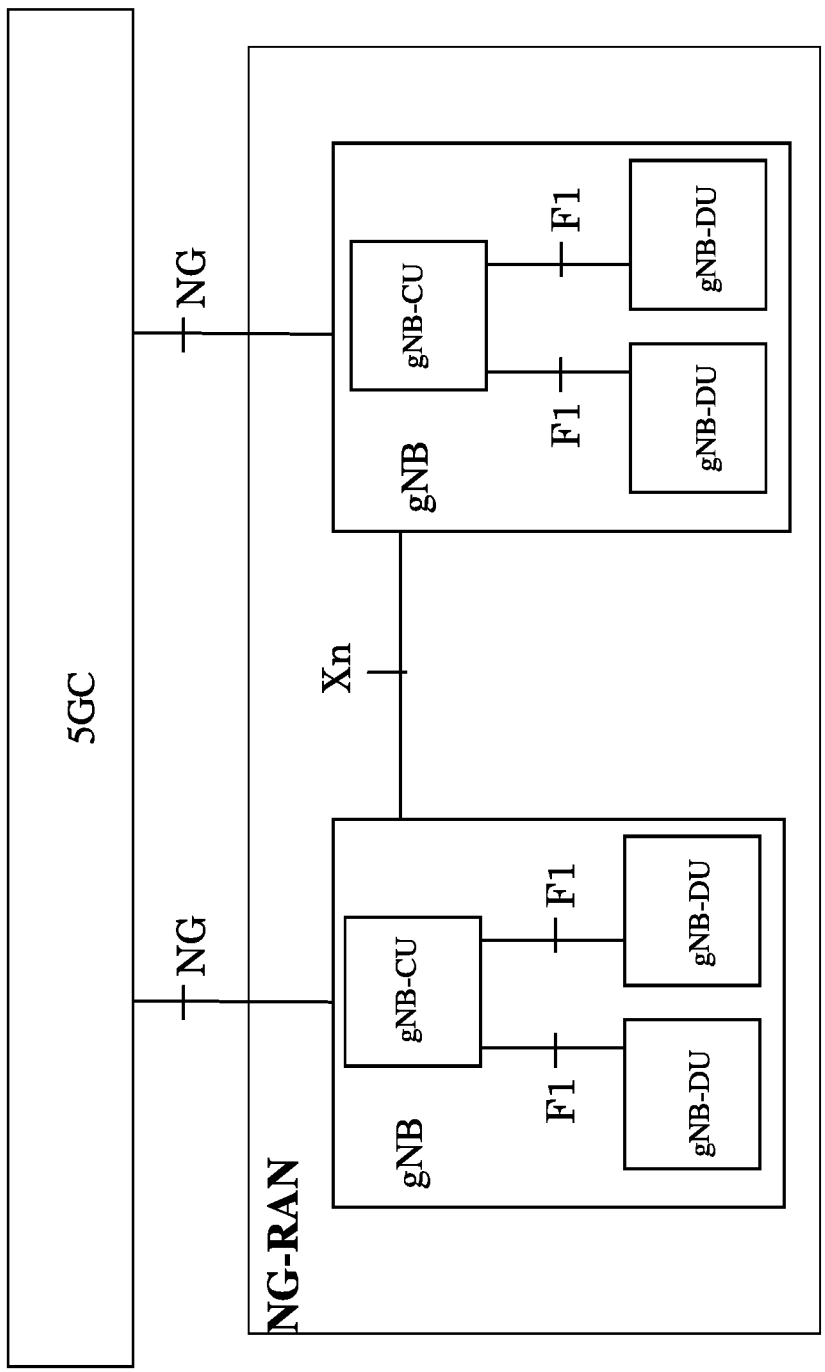
FIG. 1 illustrates Scell activation/deactivation related procedures specified for Rel15 NR.
Figure 2:
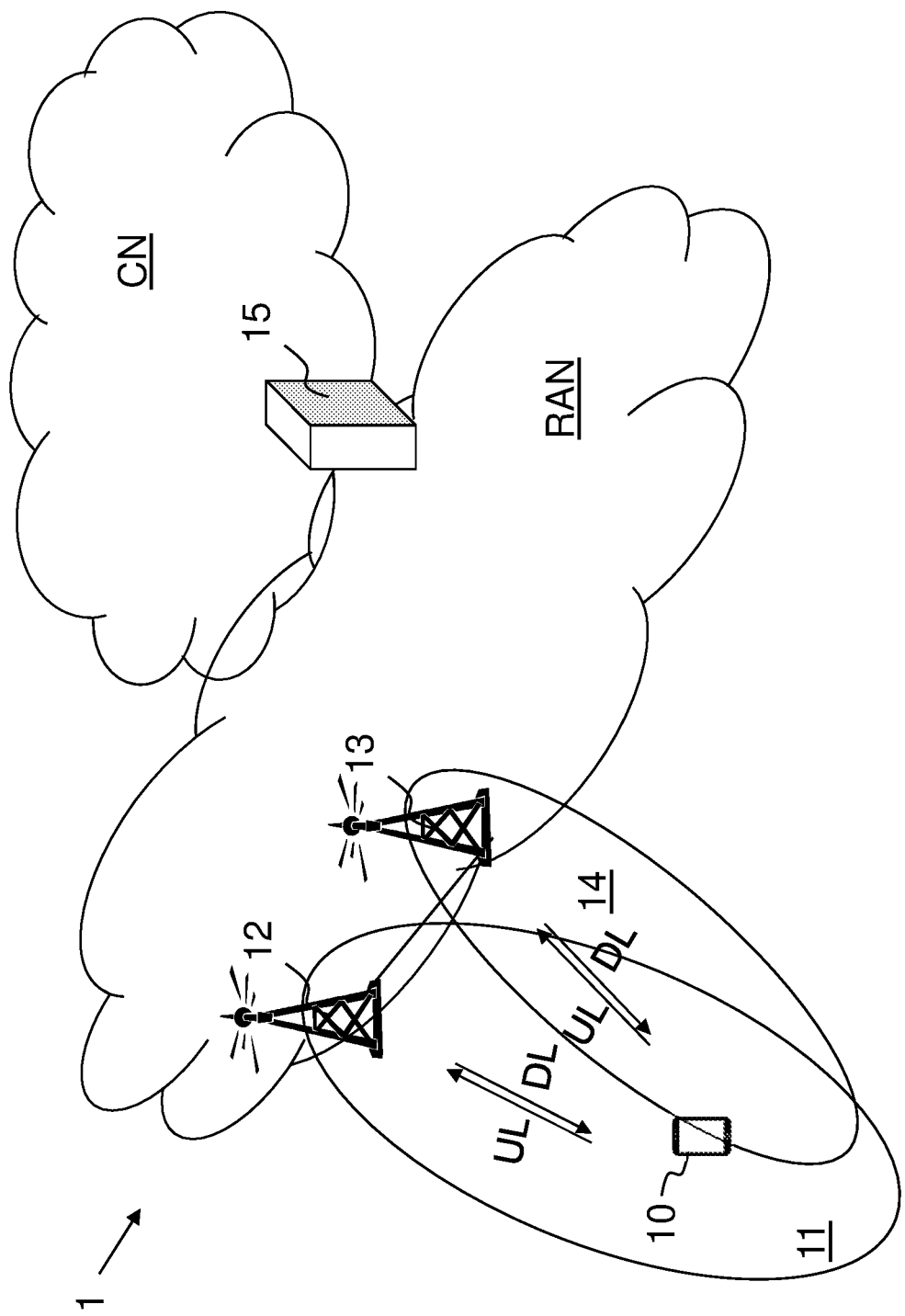
FIG. 2 is a schematic overview depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use one or a number of different technologies, such as Wi-Fi, Long Term Evolution (LTE), LTE-Advanced, Fifth Generation (5G), Wideband Code Division Multiple Access (WCDMA), Global System for Mobile communications/ enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices e.g. a UE 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first radio network node 12 providing radio coverage over a geographical area, a first service area 11, of a radio access technology (RAT), such as LTE, WiMAX or similar. The first radio network node 12 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a gNodeB (gNB), a base transceiver station, a radio remote unit, an Access Point Base Station, a base station router, a transmission arrangement of a radio base station, a stand-alone access point or any other network unit or node capable of communicating with a UE within the area served by the first network node 12 depending e.g. on the radio access technology and terminology used. The first radio network node 12 may alternatively or additionally be a controller node or a packet processing node such as a radio controller node or similar. The first radio network node 12 may be referred to as the radio network node, the master node or as a serving network node wherein the first cell may be referred to as a serving cell or primary cell, and the serving network node communicates with the UE 10 in form of DL transmissions to the UE 10 and UL transmissions from the UE 10.

The wireless communication network 1 comprises a second radio network node 13 providing radio coverage over a geographical area, a second service area 14, of a radio access technology (RAT), such as LTE, Wi-Fi, WiMAX or similar. The second radio network node 13 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a gNodeB (gNB), a base transceiver station, a radio remote unit, an Access Point Base Station, a base station router, a transmission arrangement of a radio base station, a stand-alone access point or any other network unit or node capable of communicating with a UE within the area served by the second radio network node 13 depending e.g. on the radio access technology and terminology used. The second radio network node 13 may alternatively or additionally be a controller node or a packet processing node such as a radio controller node or similar. The second radio network node 13 may be referred to as a secondary serving network node, or a secondary node, wherein the second service area may be referred to as a secondary serving cell or secondary cell, and the serving network node communicates with the UE 10 in form of DL transmissions to the UE 10 and UL transmissions from the UE 10.

The wireless communication network 1 comprises an OAM node 15 managing operation and maintenance in the wireless communication network.

According to embodiments herein a network node, which network node may be any node such as a gNB-CU, any radio network node, or the OAM node 15, monitors communication in the wireless communication network. The first radio network node 12 and the second radio network node 13 provide dual connectivity to the UE 10. The network node calculates an average delay of packet transmission wherein weighting is applied to the number of packets respectively sent via the first radio network node and the second radio network node when no packet duplication is applied. Furthermore, weighting is also applied for the respective delay calculation for the one or more periods and/or packets with duplication, and the periods and/or packets without duplication.

Note that, in a general scenario, the term "radio network node" can be substituted with "transmission point". Distinction between the transmission points (TPs) may typically be based on CRSs or different synchronization signals transmitted. Several TPs may be logically connected to the same radio network node but if they are geographically separated, or are pointing in different propagation directions, the TPs may be subject to the same mobility issues as different radio network nodes. In subsequent sections, the terms "radio network node" and "TP" can be thought of as interchangeable.

Figure 3A:
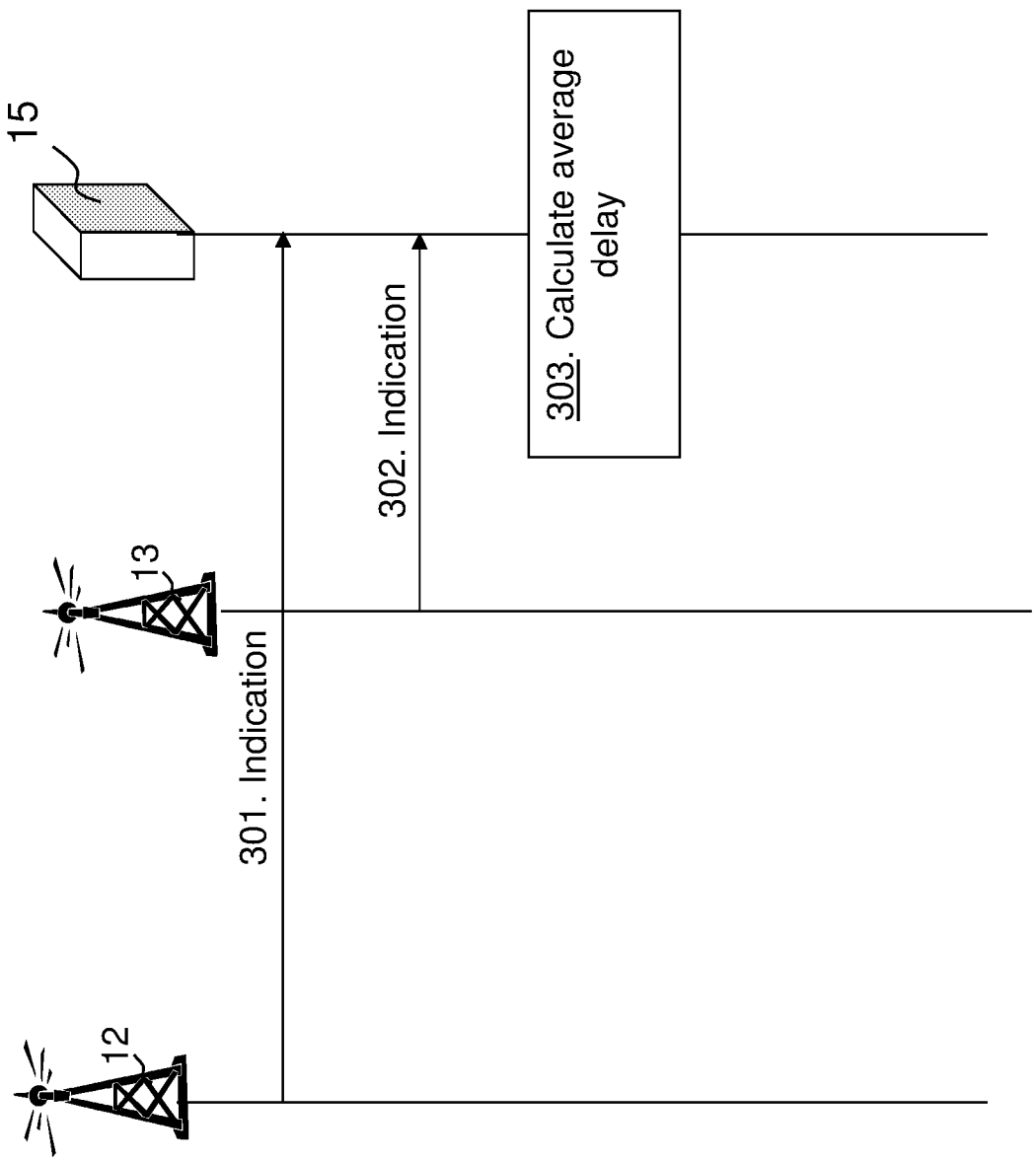
FIGS. 3A-3C are flowcharts depicting methods performed by network nodes according to embodiments herein.

FIG. 3A is a combined flowchart and signalling scheme according to embodiments herein. The actions may be performed in any suitable order.

Action 301. The first radio network node 12 may transmit a first calculated delay of communicated packets and/or a first number of packets sent via the first radio network node 12 when no packet duplication is applied, and another first calculated delay and/or a second number of packets sent via the first radio network node 12 when packet duplication is applied.

Action 302. The second radio network node 13 may transmit a second calculated delay of communicated packets and/or a third number of packets sent via the second radio network node when no packet duplication is applied, and another second calculated delay and/or a fourth number of packets sent via the second radio network node 13 when packet duplication is applied.

Action 303. The network node such as the OAM node 15, or any of the radio network nodes, calculates an average delay of packet transmission, wherein weighting is applied to the number of packets respectively sent via the first radio network node 12 and the second radio network node 13 when no packet duplication is applied. Furthermore, weighting is also applied for the respective delay calculation for the one or more periods or packets with duplication, and the periods or packets without duplication.

Embodiments concern the introduction of a weighted averaging method for the computation of the RAN internal delay by the network node hosting the PDCP, e.g., CU-user plane (UP).

Embodiments propose a weighted averaging-based method to compute the total RAN delay for a given bearer in the split bearer scenario. The weighting is applied to the number of packets respectively sent via the MN and the SN when no packet duplication is applied. Furthermore, to handle scenarios where the configuration changes between packet duplication and no packet duplication during the measurement period, weighting is also applied for the respective delay calculation measurements/methods for the periods and/or packets with duplication and the periods and/or packets without duplication. The node computing the total delay measurement, that is, the network node, may be informed when duplication was enabled and when it was disabled.

Figure 3B:
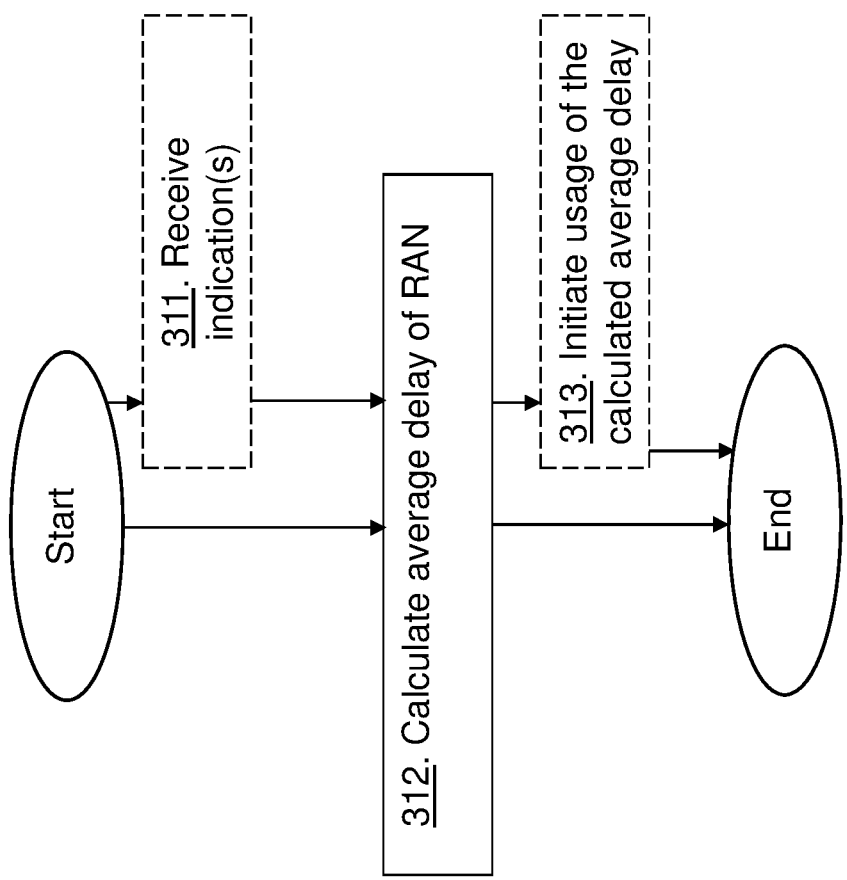

The method actions performed by the network node, such as a central unit, an OAM node, or a radio network node, for handling communication in the wireless communication network comprising the first radio network node 12 and the second radio network node 13 providing dual connectivity to the UE 10 according to embodiments herein, will now be described with reference to a flowchart depicted in FIG. 3B. The actions do not have to be taken in the order stated below, but may be taken in any suitable order. Actions performed in some embodiments are marked with dashed boxes.

Action 311. The network node may obtain an indication of delay of a respective radio network node and number of packets transmitted with duplication over a first period, and/or another indication indicating a delay of respective radio network node and number of packets sent via the radio network node with non-duplication over a second period. Thus, the network node may obtain indications of delay of the respective radio network node and number of packets transmitted with duplication and/or non-duplication over a respective period. This may be obtained from within, from UEs, radio network nodes, or from another network node.

Action 312. The network node calculates the average delay of packet transmission, wherein weighting is applied to the number of packets respectively sent via the first radio network node and the second radio network node when no packet duplication is applied. Furthermore, weighting is also applied for the respective delay calculation for the one or more packets, or periods, with duplication, and the packets, or periods, without duplication. The network node may perform weighting by deriving a first weight for a first delay calculated at the first radio network node 12 and a second weight for a second delay calculated at the second radio network node 13, on the basis of at least one of the following:

- a first number of packets for a given bearer sent via the first radio network node 12 and a second number of packets sent via the second radio network node when the duplication was not enabled and the first and second delays experienced by packets of the first radio network node and the second radio network node; and
- a third number of packets for the given bearer sent via both the first radio network node 12 and the second radio network node 13 when the duplication was enabled and the first and second delays experienced by packets of the first radio network node 12 and the second radio network node 13.

Total DL RAN Delay

Method-1:

Herein the radio network node comprises CU-UP and a CU-CP. The weighted averaging for the DL RAN delay may be computed as follows.

Total $DL\ RAN$ delay =

$$D_{PDCP} + \frac{N_{Dup} * D_{Best} + N_{NonDupMN} * D_{MN} + N_{NonDupSN} * D_{SN}}{N_{Dup} + N_{NonDupMN} + N_{NonDupSN}}$$

where

| | |
|---|---|
| $D_{PDCP}$ | The average delay in the CU-UP during the measurement period. |
| $N_{Dup}$ | The number of packets duplicated via both MN and SN during the measurement period. |
| $D_{Best}$ | The minimum of the average delay experienced on the MN and the average delay experienced on the SN i.e., $D_{Best} = \text{Min}(D_{MN}, D_{SN})$ An alternative way to calculate $D_{Best}$ is to determine the minimum delay for each duplicated packet and then compute the average of this. The formula for $D_{Best}$ would then be: $$D_{Best} = \frac{\sum_{i=1}^{N_{Dup}} \min(D_{MN,i}, D_{SN,i})}{N_{Dup}}$$ where "$D_{MN,i}$" is the delay of packet i on the leg via the MN and "$D_{SN,i}$" is the delay of packet i on the leg via the SN. Furthermore, $D_{MN,i} = D_{MN-F1,i} + D_{MN-DU,i} + D_{MN-air,i}$ and $D_{SN,i} = D_{SN-F1,i} + D_{SN-DU,i} + D_{SN-air,i}$ |
| $N_{NonDupMN}$ | The number of packets sent via MN when the PDCP duplication is not enabled during the measurement period. |
| $D_{MN}$ | The average delay experienced by the packets sent on the MN during the measurement period. This average delay is performed as follows. $D_{MN} = D_{MN-F1} + D_{MN-DU} + D_{MN-air}$ wherein, |
| $D_{MN-F1}$ | Average delay over F1-U interface (between the CU-UP and the MN gNB-DU). |
| $D_{MN-DU}$ | Average delay within the MN DU (i.e., the processing delay). |
| $D_{MN-air}$ | Average delay over the air interface between the MN gNB-DU and the UE. |
| $N_{NonDupSN}$ | The number of packets sent via SN when the PDCP duplication is not enabled during the measurement period. |
| $D_{SN}$ | The average delay experienced by the packets sent on the SN during the measurement period. This average delay is performed as follows. $D_{SN} = D_{SN-F1} + D_{SN-DU} + D_{SN-air}$ wherein, |
| $D_{SN-F1}$ | Average delay over F1-U interface (between the CU-UP and the SN gNB-DU) |
| $D_{SN-DU}$ | Average delay within the SN DU (i.e., the processing delay). |
| $D_{SN-air}$ | Average delay over the air interface between the SN gNB-DU and the UE. |

Method-2 (DL):

In this method, the weighted average for the DL RAN delay is computed, based on the relative time periods during which packet duplication or non-duplication is configured, and the weighted average may be calculated irrespective of the number of packets transmitted during these time periods, as follows.

$$\text{Total } DL\ RAN\ \text{delay} = D_{PDCP} + \frac{T_{Dup} * D_{Best} + T_{NonDup} * D_{Avg}}{T_{Dup} + T_{NonDup}}$$

where

| | |
|---|---|
| $D_{PDCP}$ | The average delay in the CU-UP during the measurement period. |
| $T_{Dup}$ | The time duration during which the packets were duplicated via both MN and SN during the measurement period. |
| $D_{Best}$ | The minimum of the average delay experienced on the MN and the average delay experienced on the SN i.e., $D_{Best} = \text{Min}(D_{MN}, D_{SN})$ An alternative way to calculate $D_{Best}$ is to determine the minimum delay for each duplicated packet and then compute the average of this. The formula for $D_{Best}$ would then be: $$D_{Best} = \frac{\sum_{i=1}^{N_{Dup}} \min(D_{MN,i}, D_{SN,i})}{N_{Dup}}$$ where "$D_{MN,i}$" is the delay of packet i on the leg via the MN and "$D_{SN,i}$" is the delay of packet i on the leg via the SN. Furthermore, $D_{MN,i} = D_{MN-F1,i} + D_{MN-DU,i} + D_{MN-air,i}$ and $D_{SN,i} = D_{SN-F1,i} + D_{SN-DU,i} + D_{SN-air,i}$ |
| $T_{NonDup}$ | The time duration during which the packets were sent via MN or via the SN i.e., the PDCP duplication is not enabled during the measurement period |
| $D_{Avg}$ | The average delay experienced by the packets sent on the MN or SN during the measurement period. This average delay is performed as follows (i.e. weighted based on the number of packets). $$D_{Avg} = \frac{N_{NonDupMN} * D_{MN} + N_{NonDupSN} * D_{SN}}{N_{NonDupMN} + N_{NonDupSN}}$$ |
| $N_{NonDupMN}$ | The number of packets sent via MN when the PDCP duplication is not enabled during the measurement period. |

| | |
|---|---|
| $D_{MN}$ | The average delay experienced by the packets sent on the MN during the measurement period. This average delay is performed as follows.<br>$D_{MN} = D_{MN-F1} + D_{MN-DU} + D_{MN-air}$<br>wherein, |
| $D_{MN-F1}$ | Average delay over F1-U interface (between the CU-UP and the MN gNB-DU). |
| $D_{MN-DU}$ | Average delay within the MN DU (i.e., the processing delay). |
| $D_{MN-air}$ | Average delay over the air interface between the MN gNB-DU and the UE. |
| $N_{NonDupSN}$ | The number of packets sent via SN when the PDCP duplication is not enabled during the measurement period. |
| $D_{SN}$ | The average delay experienced by the packets sent on the SN during the measurement period. This average delay is performed as follows.<br>$D_{SN} = D_{SN-F1} + D_{SN-DU} + D_{SN-air}$<br>wherein |
| $D_{SN-F1}$ | Average delay over F1-U interface (between the CU-UP and the SN gNB-DU) |
| $D_{SN-DU}$ | Average delay within the SN DU (i.e., the processing delay) |
| $D_{SN-air}$ | Average delay over the air interface between the SN gNB-DU and the UE. |

Total UL RAN Delay

Method-1 (UL):

The weighted average for the UL RAN delay may be computed as follows.

Total UL RAN delay =

$$D_{PDCP} + \frac{N_{Dup} * D_{Best} + N_{NonDupMN} * D_{MN} + N_{NonDupSN} * D_{SN}}{N_{Dup} + N_{NonDupMN} + N_{NonDupSN}}$$

where

| | |
|---|---|
| $D_{PDCP}$ | The average delay in the CU-UP during the measurement period. |
| $N_{Dup}$ | The number of packets duplicated via both MN and SN during the measurement period. |
| $D_{Best}$ | The minimum of the average delay experienced on the MN and the average delay experienced on the SN i.e., $D_{Best} = \text{Min}(D_{MN}, D_{SN})$<br>An alternative way to calculate $D_{Best}$ is to determine the minimum delay for each duplicated packet and then compute the average of this. The formula for $D_{Best}$ would then be:<br>$$D_{Best} = \frac{\sum_{i=1}^{N_{Dup}} \min(D_{MN,i}, D_{SN,i})}{N_{Dup}}$$<br>where "$D_{MN,i}$" is the delay of packet i on the leg via the MN and "$D_{SN,i}$" is the delay of packet i on the leg via the SN. Furthermore,<br>$D_{MN,i} = D_{MN-F1,i} + D_{MN-DU,i} + D_{MN-air,i} + D_{MN-UE,i}$<br>and $D_{SN,i} = D_{SN-F1,i} + D_{SN-DU,i} + D_{SN-air,i} + D_{SN-UE,i}$ |
| $N_{NonDupMN}$ | The number of packets sent via MN when the PDCP duplication is not enabled during the measurement period |
| $D_{MN}$ | The average delay experienced by the packets sent on the MN during the measurement period. This average delay is performed as follows.<br>$D_{MN} = D_{MN-F1} + D_{MN-DU} + D_{MN-air} + D_{MN-UE}$<br>wherein, |
| $D_{MN-F1}$ | Average delay over F1-U interface (between the CU-UP and the MN gNB-DU) |
| $D_{MN-DU}$ | Average delay within the MN DU (i.e., the processing delay) |
| $D_{MN-air}$ | Average delay over the air interface between the MN gNB-DU and the UE. |
| $D_{MN-UE}$ | Average PDCP queueing delay as measured by the UE for the packets sent via the MN DU. |
| $N_{NonDupSN}$ | The number of packets sent via SN when the PDCP duplication is not enabled during the measurement period |
| $D_{SN}$ | The average delay experienced by the packets sent on the SN during the measurement period. This average delay is performed as follows.<br>$D_{SN} = D_{SN-F1} + D_{SN-DU} + D_{SN-air} + D_{SN-UE}$<br>wherein, |
| $D_{SN-F1}$ | Average delay over F1-U interface (between the CU-UP and the SN gNB-DU) |
| $D_{SN-DU}$ | Average delay within the SN DU (i.e., the processing delay) |
| $D_{SN-air}$ | Average delay over the air interface between the SN gNB-DU and the UE. |
| $D_{SN-UE}$ | Average PDCP queueing delay as measured by the UE for the packets sent via the SN DU. |

Method-2 (UL):

In this method, the weighted average for the UL RAN delay may be computed, based on the relative time periods during which packet duplication or non-duplication is configured, and it may be calculated irrespective of the number of packets transmitted during these time periods, as follows.

$$\text{Total } UL \text{ } RAN \text{ delay} = D_{PDCP} + \frac{T_{Dup} * D_{Best} + T_{NonDup} * D_{Avg}}{T_{Dup} + T_{NonDup}}$$

where

| | |
|---|---|
| $D_{PDCP}$ | The average delay in the CU-UP during the measurement period. |
| $T_{Dup}$ | The time duration during which the packets were duplicated via both MN and SN during the measurement period. |
| $D_{Best}$ | The minimum of the average delay experienced on the MN and the average delay experienced on the SN i.e., $D_{Best} = \text{Min}(D_{MN}, D_{SN})$<br>An alternative way to calculate $D_{Best}$ is to determine the minimum delay for each duplicated packet and then compute the average of this packet. The formula for $D_{Best}$ would then be:<br>$$D_{Best} = \frac{\sum_{i=1}^{N_{Dup}} \min(D_{MN,i}, D_{SN,i})}{N_{Dup}}$$<br>where "$D_{MN,i}$" is the delay of packet i on the leg via the MN and "$D_{SN,i}$" is the delay of packet i on the leg via the SN. Furthermore,<br>$D_{MN,i} = D_{MN-F1,i} + D_{MN-DU,i} + D_{MN-air,i} + D_{MN-UE,i}$<br>and $D_{SN,i} = D_{SN-F1,i} + D_{SN-DU,i} + D_{SN-air,i} + D_{SN-UE,i}$ |
| $T_{NonDup}$ | The time duration during which the packets were sent via MN or via the SN i.e., the PDCP duplication is not enabled during the measurement period. |
| $D_{Avg}$ | The average delay experienced by the packets sent on the MN or SN during the measurement period. This average delay is performed as follows.<br>$$D_{Avg} = \frac{N_{NonDupMN} * D_{MN} + N_{NonDupSN} * D_{SN}}{N_{NonDupMN} + N_{NonDupSN}}$$ |
| $N_{NonDupMN}$ | The number of packets sent via MN when the PDCP duplication is not enabled during the measurement period. |
| $D_{MN}$ | The average delay experienced by the packets sent on the MN during the measurement period. This average delay is performed as follows. |

-continued

| | $D_{MN} = D_{MN-F1} + D_{MN-DU} + D_{MN-air} + D_{MN-UE}$ wherein, |
|---|---|
| $D_{MN-F1}$ | Average delay over F1-U interface (between the CU-UP and the MN gNB-DU) |
| $D_{MN-DU}$ | Average delay within the MN DU (i.e., the processing delay) |
| $D_{MN-air}$ | Average delay over the air interface between the MN gNB-DU and the UE. |
| $D_{MN-UE}$ | Average PDCP queueing delay as measured by the UE for the packets sent via the MN DU. |
| $N_{NonDupSN}$ | The number of packets sent via SN when the PDCP duplication is not enabled during the measurement period. |
| $D_{SN}$ | The average delay experienced by the packets sent on the SN during the measurement period. This average delay is performed as follows. |
| | $D_{SN} = D_{SN-F1} + D_{SN-DU} + D_{SN-air} + D_{SN-UE}$ wherein, |
| $D_{SN-F1}$ | Average delay over F1-U interface (between the CU-UP and the SN gNB-DU) |
| $D_{SN-DU}$ | Average delay within the SN DU (i.e., the processing delay) |
| $D_{SN-air}$ | Average delay over the air interface between the SN gNB-DU and the UE. |
| $D_{SN-UE}$ | Average PDCP queueing delay as measured by the UE for the packets sent via the SN DU. |

Action 313. The network node may then initiate usage of the calculated average delay. For example, the network node may initiate use the calculated average delay for operation administration and maintenance (OAM) performance observability or for QoS verification of MDT or for QoS monitoring.

Figure 3C:
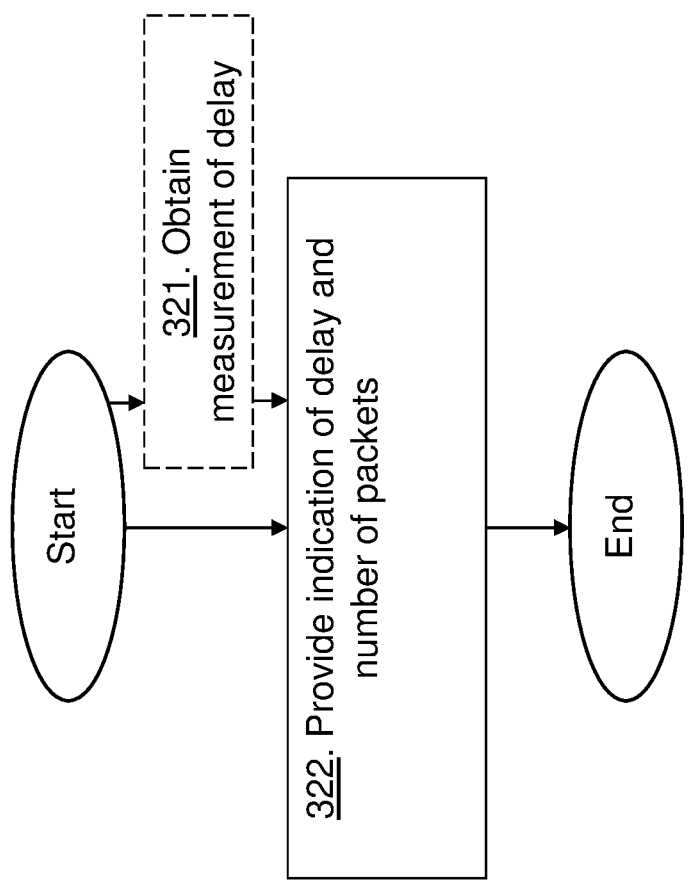

The method actions performed by the radio network node, such as the first or the second radio network node, for handling communication (of the UE) in the wireless communication network comprising the first and the second radio network node providing dual connectivity to the UE 10 according to embodiments herein will now be described with reference to a flowchart depicted in FIG. 3C. The actions do not have to be taken in the order stated below, but may be taken in any suitable order. Actions performed in some embodiments are marked with dashed boxes.

Action 321. The radio network node may obtain indications, measurements, calculations related to delay of communicated packets.

Action 322. The radio network node provides, to the network node, the indication indicating the delay and the number of packets sent via the radio network node when no packet duplication is applied over a first period, and/or another indication indicating the delay and the number of packets sent via the radio network node when duplication is applied over a second period. For example, the radio network node may transmit to the network node, such as another radio network node or an OAM node e.g. a TCE, one or more indications indicating delay of communicated packets and/or number of packets transmitted with duplication and/or non-duplication over a respective period.

In some embodiments, the radio network node comprising a CU-UP reports the total RAN delay as computed by either of the methods listed above to the CN.

In some other embodiments, the CU-UP reports the total RAN delay, the minimum RAN delay and/or maximum RAN delay (for duplicated packets) to the CN, wherein the minimum RAN delay is same as $D_{Best}$ and the maximum RAN delay is the Max($D_{MN}$, $D_{SN}$). Similarly as was described for the $D_{Best}$ calculation above, an alternative way of calculating the maximum RAN delay $D_{RAN-Max}$, is $$D_{Best} = \frac{\sum_{i=1}^{N_{Dup}} \max(D_{MN,i}, D_{SN,i})}{N_{Dup}}$$

where "$D_{MN,i}$" is the delay of packet i on the leg via the MN and "$D_{SN,i}$" is the delay of packet i on the leg via the SN. When this formula is applied to the DL (i.e. calculating the maximum DL RAN delay), $$D_{MN,i} = D_{MN-F1,i} + D_{MN-DU,i} + D_{MN-air,i}$$

and $$D_{SN,i} = D_{SN-F1,i} + D_{SN-DU,i} + D_{SN-air,i}$$

And when the formula is applied to the UL (i.e. calculating the maximum UL RAN delay), $$D_{MN,i} = D_{MN-F1,i} + D_{MN-DU,i} + D_{MN-air,i} D_{SN-UE,i}$$

and $$D_{SN,i} = D_{SN-F1,i} + D_{SN-DU,i} + D_{SN-air,i} + D_{SN-UE,i}$$

The CU-UP may report these delays for both UL and DL separately.

In yet another embodiment, the CU-UP reports the total RAN delay as computed by either of the methods listed above, the average delay experienced with packet duplication, e.g., $D_{Best}$, and the average delay experienced without packet duplication, e.g. $D_{Avg}$. Optionally, the radio network node, such as the CU-CP, may also indicate the fraction of the packets or the fraction of the measurement period, for which respectively packet duplication and no packet duplication were used. Again, the CU-UP may report these delays for the UL and DL separately.

In yet other embodiments, the network node may indicate which of the above described RAN delay measurements it wants the RAN, e.g. CU-UP, to report.

In embodiments about reporting of RAN delay measurements to the CN, the CU-UP may transfer the RAN delay measurement results to the CU-control plane (CP) for further reporting/transfer to the CN.

Embodiments Related to RAN to RAN Delay Reporting:

The radio network node, e.g. a MN-gNB-CU-UP, in order to calculate the delay as per methods proposed herein, may receive measurements and parameters that are collected at a different RAN node, e.g. a SN.

Examples of such parameters collected at the SN but needed at the MN, if the MN needs to perform the delay calculation, may be:

$D_{SN}$
$N_{NonDupSN}$
$T_{Dup}$

Likewise, if the SN needs to perform the delay calculation, the SN may need parameters and measurements that are collected at the MN, and examples of such parameters may be:

$D_{MN}$
$N_{NonDupMN}$
$T_{Dup}$

The parameters may be signaled over the X2 or Xn interface between gNB-CU-CPs of MN and SN.

Such signaling is possible if the corresponding CU-UP collecting the delay parameters of its competence has previously signaled such parameters to the CU-CP of the node the CU-UP belongs to.

In general, if RAN node 1 (e.g. MN) needs to retrieve delay parameters from the RAN node 2 involved in multi connectivity configuration (e.g. SN), the following procedure may be followed:

RAN node 2 DU signals its measured values of the packet delay, collected for traffic transmitted over RAN Node 2 DU, to RAN node 2 CU-UP, using existing signalling over the GTP-U protocol.

RAN Node 2 CU-CP signals the value $D_{SN/MN-UE}$, namely either the MN or the SN value, received from the UE, to the RAN Node 2 CU-UP.

RAN Node 2 CU-UP collects its measured values of the packet delay, collected for traffic transmitted over RAN Node 2 CU-UP, and signals them, together with the delay measurements received from RAN Node 2 DU and RAN Node 2 CU-CP, to RAN Node 1.

RAN Node 1 is therefore able to perform the calculations described in the methods herein.

If an immediate MDT may be configured for collecting the packet delay measurements, e.g. M6 reporting, then each of the radio network nodes, such as CU-CP, DU and CU-UP, report the respective delay measurements that they have computed/collected to the OAM node, such as a trace control entity (TCE). In order to compute the overall average RAN delay measurement by the OAM, the OAM needs to know how many packets were sent via only MN ($N_{NonDupMN}$), how many packets were from only from SN ($N_{NonDupSN}$) and how many packets were sent both from MN and SN ($N_{Dup}$).

Therefore, as part of some embodiments, upon receiving a M6 measurement configuration, the CU-UP may include the ($N_{NonDupMN}$), ($N_{NonDupSN}$), and ($N_{Dup}$) in the report sent to the TCE.

Figure 4:
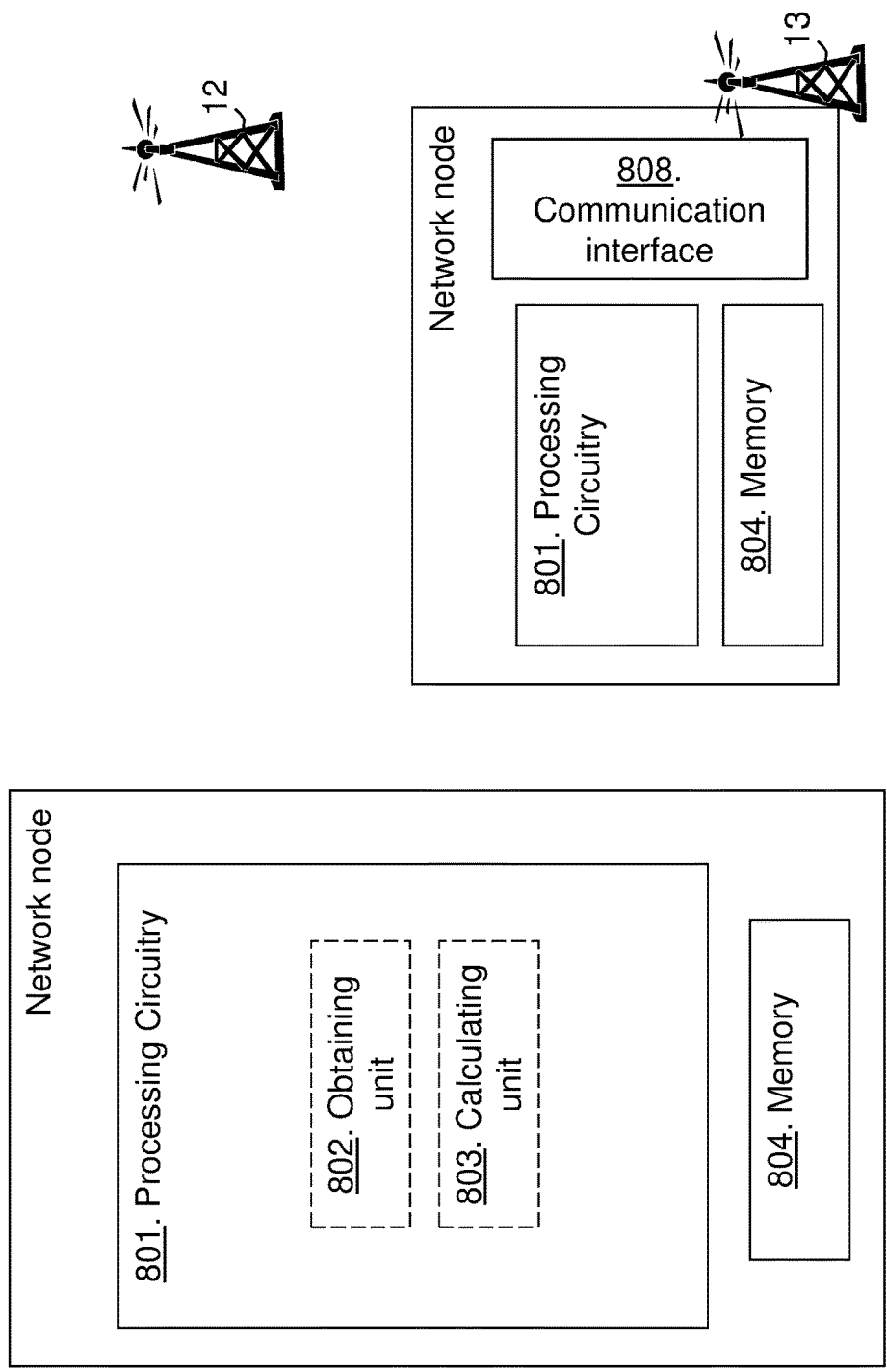
FIG. 4 is a block diagram depicting network nodes according to embodiments herein.

FIG. 4 is a block diagram depicting the network node, in two embodiments, such as an OAM node e.g. a TCE, or a radio network node, for handling communication in the wireless communication network comprising the first radio network node and the second radio network node providing dual connectivity to the UE. Handling herein meaning for example calculating packet delay in the wireless communication network 1 according to embodiments herein.

The network node may comprise processing circuitry 801, e.g., one or more processors, configured to perform the methods herein.

The network node may comprise an obtaining unit 802, e.g., a receiver or a transceiver. The network node, the processing circuitry 801, and/or the obtaining unit 802 may be configured to obtain the indication of delay of respective radio network node and the number of packets transmitted with duplication over the first period, and/or another indication indicating the delay of respective radio network node and the number of packets sent via the respective radio network node with non-duplication over a second period. Thus, the network node, the processing circuitry 801, and/or the obtaining unit 802 may be configured to obtain indications of delay of respective radio network node and/or number of packets transmitted with duplication and/or non-duplication over a respective period. This may be obtained from within or from UEs, radio network nodes, or another network node.

The network node may comprise a calculating unit 803. The network node, the processing circuitry 801, and/or the calculating unit 803 is configured to calculate the average delay of packet transmission wherein weighting is applied to the number of packets respectively sent via the first radio network node and the second radio network node when no packet duplication is applied. Furthermore, weighting is also applied for the respective delay calculation for the one or more periods and/or packets with duplication, and the periods and/or packets without duplication. The network node, the processing circuitry 801, and/or the calculating unit 803 may be configured to weight by deriving a first weight for a first delay calculated at the first radio network node and a second weight for a second delay calculated at the second radio network node, on the basis of at least one of the following:

the first number of packets for the given bearer sent via the first radio network node and the second number of packets sent via the second radio network node when the duplication was not enabled, and the first and second delays experienced by the packets of the first radio network node and the second radio network node; and the third number of packets for the given bearer sent via both the first radio network node and the second radio network node when the duplication was enabled, and the first and second delays experienced by the packets of the first radio network node and the second radio network node.

The network node may further be configured to initiate usage of the calculated average delay.

The network node further comprises a memory 804. The memory comprises one or more units to be used to store data on, such as indications, calculations, number of packets, periods, RSs, strengths or qualities, requests, commands, timers, applications to perform the methods disclosed herein when being executed, and similar.

The network node comprises a communication interface 808 comprising one or more antennas.

The methods according to the embodiments described herein for the network node are respectively implemented by means of, e.g., a computer program product 805 or a computer program, comprising instructions, i.e., software code portions, which, when executed on at least one processor, cause the at least one processor to carry out the actions described herein, as performed by the network node. The computer program product 805 may be stored on a computer-readable storage medium 806, e.g. a universal serial bus (USB) stick, a disc or similar. The computer-readable storage medium 806, having stored thereon the computer program product, may comprise the instructions which, when executed on at least one processor, cause the at least one processor to carry out the actions described herein, as performed by the network node. In some embodiments, the computer-readable storage medium may be a non-transitory or a transitory computer-readable storage medium.

Figure 5:
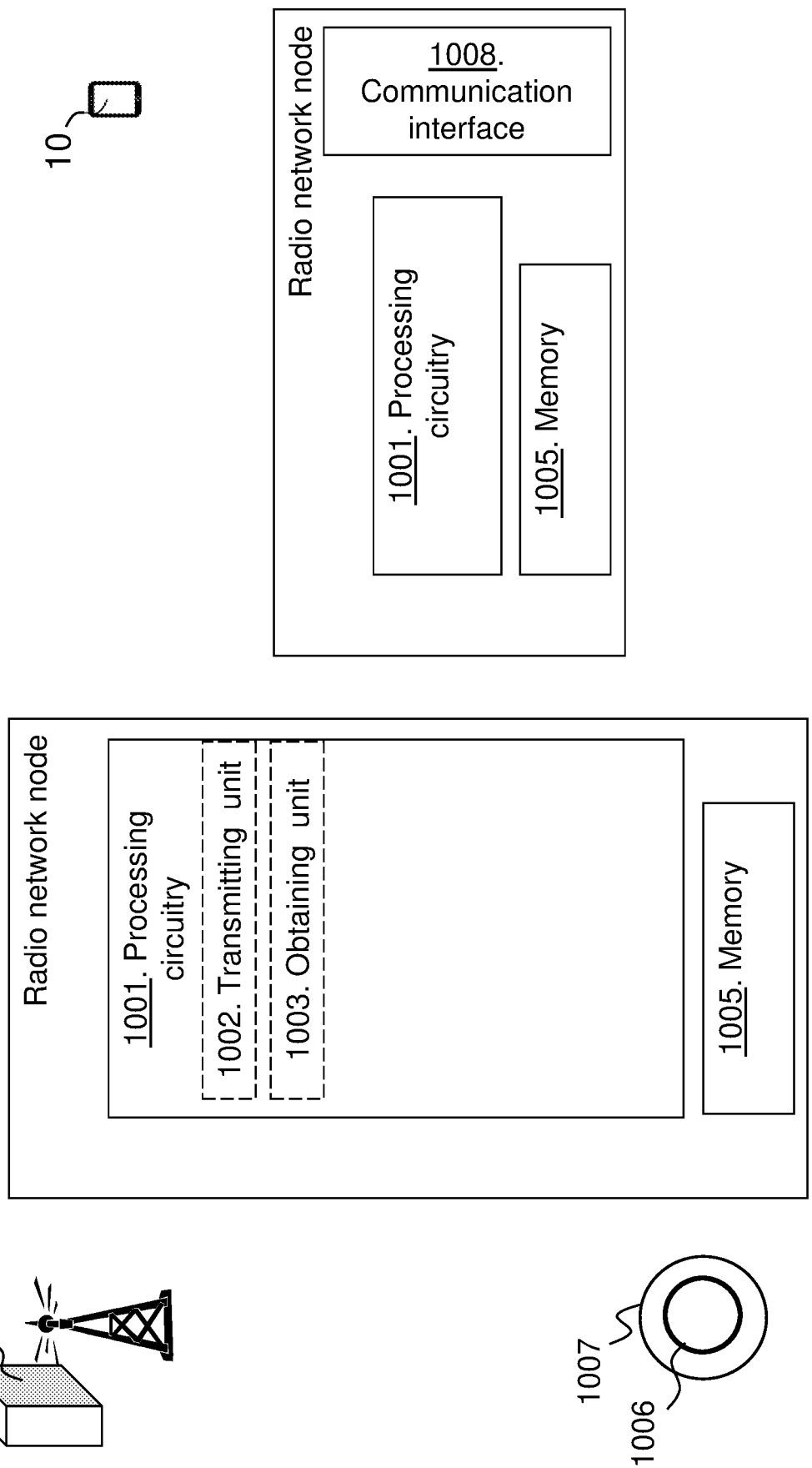
FIG. 5 is a block diagram depicting radio network nodes according to embodiments herein.

FIG. 5 is a block diagram depicting the radio network node, in two embodiments, for handling communication (of the UE) in the wireless communication network 1 comprising the first and the second radio network node providing dual connectivity to the UE such as, e.g., the UE 10, e.g., facilitating the calculation of delay, in the wireless communication network 1 according to embodiments herein.

The radio network node may comprise processing circuitry 1001, e.g. one or more processors, configured to perform the methods herein.

The radio network node may comprise a transmitting unit 1002. The radio network node, the processing circuitry 1001 and/or the transmitting unit 1002 is configured to provide to the network node, the indication indicating the delay and the number of packets sent via the radio network node when no packet duplication is applied over the first period, and/or another indication indicating the delay and the number of packets sent via the radio network node when duplication is applied over the second period. Thus, the radio network node, the processing circuitry 1001 and/or the transmitting unit 1002 may be configured to transmit, to the network node, one or more indications indicating delay of communicated packets and/or number of packets transmitted with duplication and/or non-duplication over a respective period.

The radio network node may comprise an obtaining unit 1003. The radio network node, the processing circuitry 1001 and/or the obtaining unit 1003 may be configured to obtain indications, measurements, calculations related to delay of communicated packets.

The radio network node further comprises a memory 1005. The memory comprises one or more units to be used to store data on, such as WUSs, indications, strengths or qualities, grants, scheduling information, timers, applications to perform the methods disclosed herein when being executed, and similar.

The radio network node comprises a communication interface 1008 comprising transmitter, receiver, transceiver and/or one or more antennas.

The methods according to the embodiments described herein for radio network node are respectively implemented by means of, e.g., a computer program product 1006 or a computer program product, comprising instructions, i.e., software code portions, which, when executed on at least one processor, cause the at least one processor to carry out the actions described herein, as performed by the radio network node. The computer program product 1006 may be stored on a computer-readable storage medium 1007, e.g., a USB stick, a disc or similar. The computer-readable storage medium 1007, having stored thereon the computer program product, may comprise the instructions which, when executed on at least one processor, cause the at least one processor to carry out the actions described herein, as performed by the radio network node. In some embodiments, the computer-readable storage medium may be a non-transitory or transitory computer-readable storage medium.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000 etc.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

Figure 6:
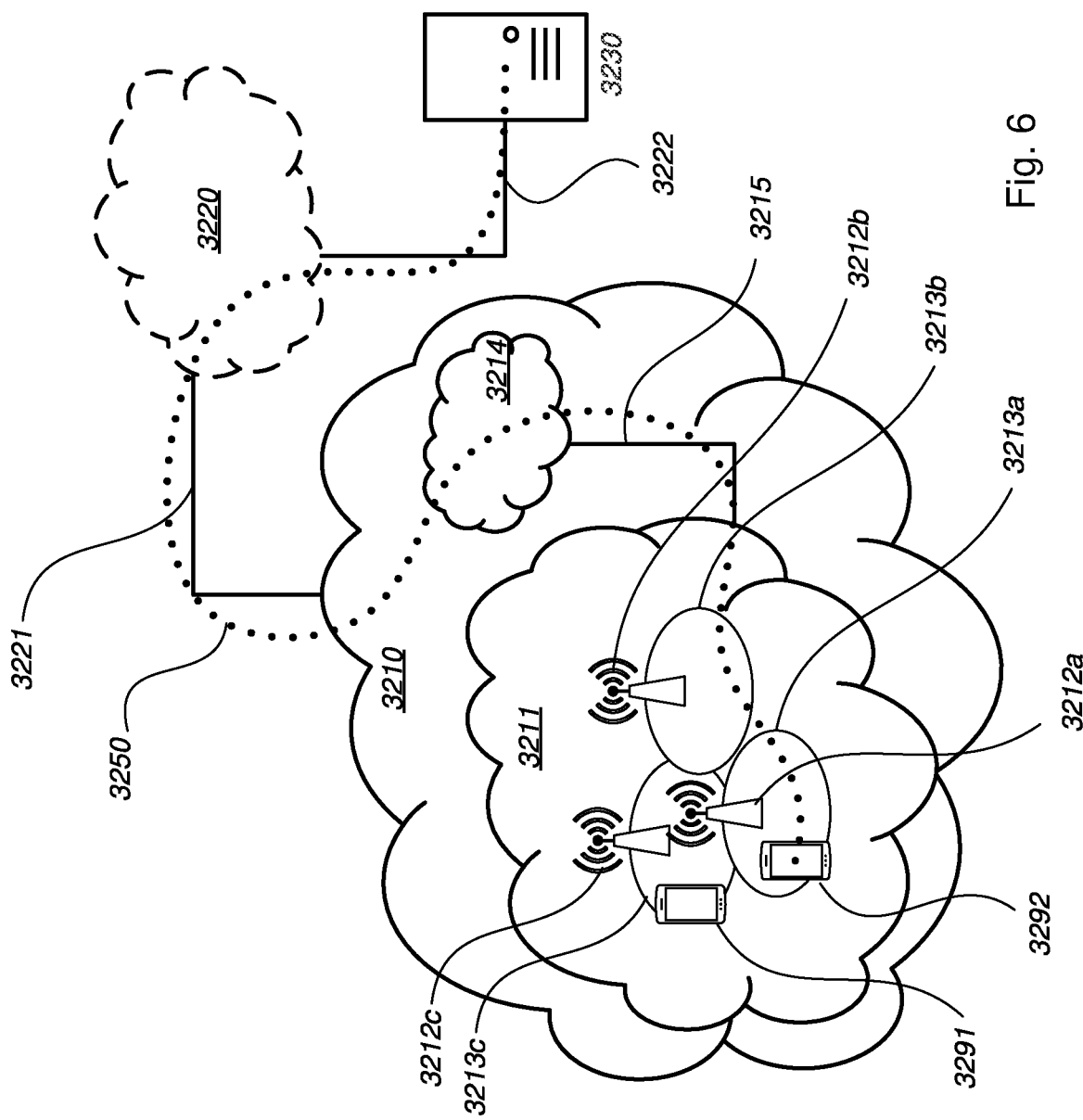
FIG. 6 schematically illustrates a telecommunication network connected via an intermediate network to a host computer.

With reference to FIG. 6, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points being examples of the radio network node 12 herein, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291, being an example of the UE 10, located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 6 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 7. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 7) served by the base station 3320. The communication interface 3326 may be configured to facilitate a connection 3360 to the host computer 3310. The connection 3360 may be direct or it may pass through a core network (not shown in FIG. 7) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions.

The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 7:
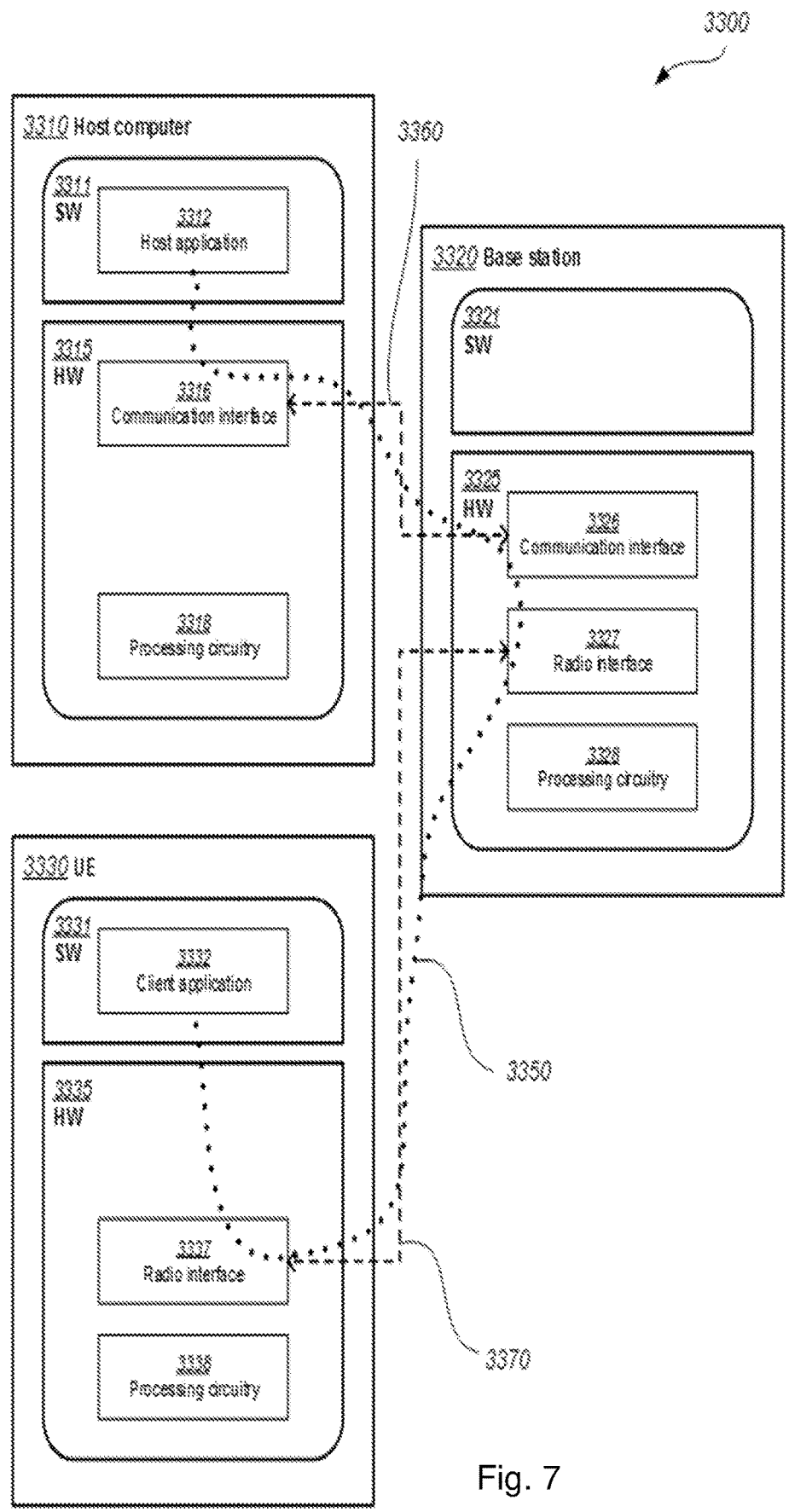
FIG. 7 is a generalized block diagram of a host computer communicating via a base station with a user equipment over a partially wireless connection.

It is noted that the host computer 3310, base station 3320 and UE 3330 illustrated in FIG. 7 may be identical to the host computer 3230, one of the base stations 3212a, 3212b, 3212c and one of the UEs 3291, 3292 of FIG. 6, respectively. This is to say, the inner workings of these entities may be as shown in FIG. 7 and independently, the surrounding network topology may be that of FIG. 6.

In FIG. 7, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the performance since delay is calculated more accurately and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 8:
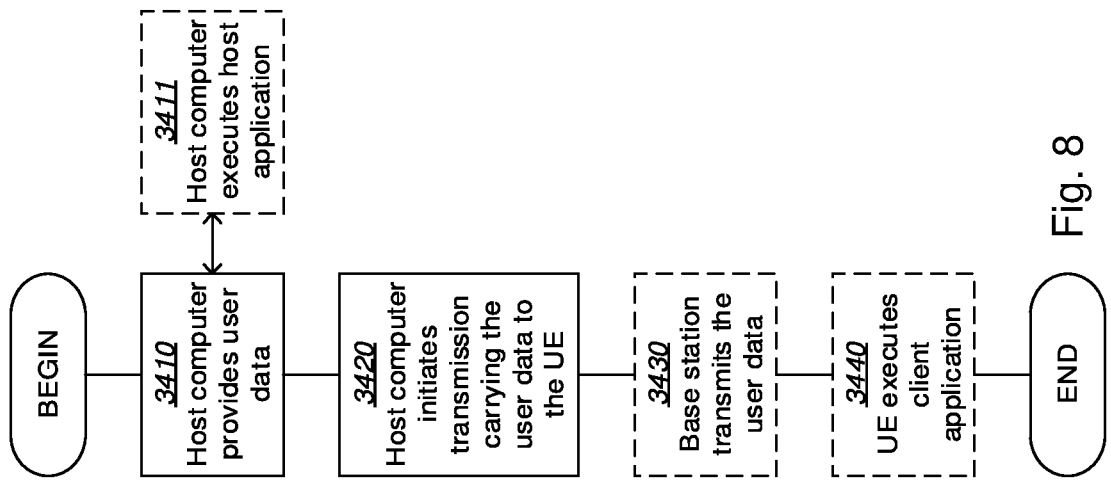

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 9:
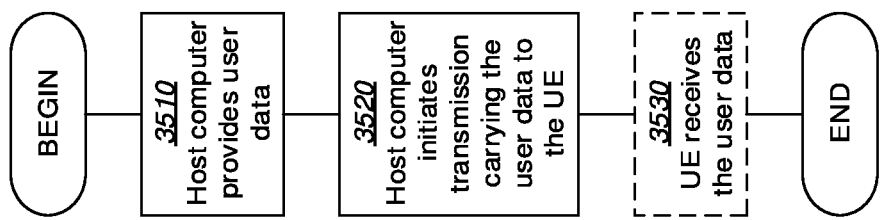

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

ABBREVIATIONS

3GPP 3rd Generation Partnership Project
CA Carrier Aggregation
CN Core Network
CP Control Plane
CU Central Unit
CU-CP Central Unit-Control Plane
CU-UP Central Unit-User Plane
DL Downlink
DU Distributed Unit
eNB eNodeB
eNodeB Evolved NodeB
EUTRA Evolved Universal Terrestrial Radio Access
F1 The interface between a CU and a DU.
F1-U The user plane part of the F1 interface, e.g. between a CU-UP and a DU.
gNB Radio base station in NR.
LTE Long Term Evolution
MAC Medium Access Control
MCG Master Cell Group
MDT Minimization of Drive Tests
MN Master Node
NR New Radio
PDCP Packet Data Convergence Protocol
RAN Radio Access Network
RAT Radio Access Technology
RLC Radio Link Control
RLF Radio Link Failure
RNC Radio Network Controller
RRC Radio Resource Control
SN Secondary Node
TCE Trace Collection Entity
TS Technical Specification UE User Equipment
UL Uplink
UP User Plane

The invention claimed is:

1. A method performed by a network node configured to handle communication in a wireless communication network comprising a first radio network node (RNN) and a second RNN providing dual connectivity to a user equipment (UE), the method comprising:
calculating an average delay of packets transmitted or received via the first and second RNNs during a measurement period, based on the following:
first and second delays for the respective first and second RNNs during the measurement period; and
a third delay associated with both the first and second RNNs during the measurement period;
respective weights for the first, second, and third delays, wherein the respective weights are based on one or more of the following:
respective numbers of packets transmitted or received when packet duplication was enabled and not enabled during the measurement period; and
respective durations of periods when packet duplication was enabled and not enabled during the measurement period.

2. The method of claim 1, further comprising calculating the respective weights according to the following:
a third weight for the third delay, based on a ratio of a first duration when packet duplication was enabled, to a sum of the first duration and a second when packet duplication was not enabled; and
a weight for an average of the first and second delays, based on a ratio of the second duration to the sum of the first duration and the second duration.

3. The method of claim 1, further comprising calculating the respective weights according to the following:
a third weight for the third delay, based on a ratio of a third number of packets transmitted or received via both the first and second RNNs when packet duplication was enabled, to a sum of the following:
a first number of packets transmitted or received via first RNN when packet duplication was not enabled,
a second number of packets transmitted or received via second RNN when packet duplication was not enabled, and
the third number of packets;
a second weight for the second delay, based on a ratio of the second number to the sum:
a first weight for the first delay, based on a ratio of the first number to the sum.

4. The method of claim 1, further comprising calculating the third delay based on a minimum of the following: a delay for the first RNN when packet duplication was enabled, and a delay for the second RNN when packet duplication was enabled.

5. The method of claim 1, further comprising obtaining indications of one or more of the following from the first and second RNNs:
first and second delays for the respective first and second RNNs during the measurement period; and
first and second numbers of packets transmitted or received via the respective first and second RNNs during the measurement period.

6. The method of claim 5, wherein indications of the following are obtained from each of the first and second RNNs:
respective delays when packet duplication was enabled and not enabled during the measurement period; and
respective numbers of packets transmitted or received when packet duplication was enabled and not enabled during the measurement period.

7. The method of claim 1, further comprising initiating usage of the calculated average delay for one or more of the following operations in the wireless communication network:
operation administration and maintenance (OAM) performance observability, quality-of-service (QOS) verification for minimization of drive testing (MDT), and core network monitoring of radio access network (RAN) QoS.

8. A non-transitory, computer-readable medium storing computer-executable instructions that, when executed on at least one processor, cause the at least one processor to perform operations corresponding to the method according to claim 1.

9. A network node configured to handle communication in a wireless communication network comprising a first radio network node (RNN) and a second RNN providing dual connectivity to a user equipment (UE), the network node comprising processing circuitry configured to:
calculate an average delay of packets transmitted or received via the first and second RNNs during a measurement period, based on the following:
first and second delays for the respective first and second RNNs during the measurement period; and
a third delay associated with both the first and second RNNs during the measurement period;
respective weights for the first, second, and third delays, wherein the respective weights are based on one or more of the following:
respective numbers of packets transmitted or received when packet duplication was enabled and not enabled during the measurement period; and
respective durations of periods when packet duplication was enabled and not enabled during the measurement period.

10. The network node of claim 9, wherein the processing circuitry is further configured to calculate the respective weights according to the following:
a third weight for the third delay, based on a ratio of a first duration when packet duplication was enabled, to a sum of the first duration and a second when packet duplication was not enabled; and
a weight for an average of the first and second delays, based on a ratio of the second duration to the sum of the first duration and the second duration.

11. The network node of claim 9, wherein the processing circuitry is further configured to calculate the respective weights according to the following:
a third weight for the third delay, based on a ratio of a third number of packets transmitted or received via both the first and second RNNs when packet duplication was enabled, to a sum of the following:
a first number of packets transmitted or received via first RNN when packet duplication was not enabled,
a second number of packets transmitted or received via second RNN when packet duplication was not enabled, and
the third number of packets;
a second weight for the second delay, based on a ratio of the second number to the sum:
a first weight for the first delay, based on a ratio of the first number to the sum.

12. The network node of claim 9, wherein the processing circuitry is further configured to calculate the third delay based on a minimum of the following: a delay for the first RNN when packet duplication was enabled, and a delay for the second RNN when packet duplication was enabled.

13. The network node of claim 9, wherein the processing circuitry is further configured to obtain indications of one or more of the following from the first and second RNNs:
- first and second delays for the respective first and second RNNs during the measurement period; and
- first and second numbers of packets transmitted or received via the respective first and second RNNs during the measurement period.

14. The network node of claim 13, wherein indications of the following are obtained from each of the first and second RNNs:
- respective delays when packet duplication was enabled and not enabled during the measurement period; and
- respective numbers of packets transmitted or received when packet duplication was enabled and not enabled during the measurement period.

15. The network node of claim 9, wherein the processing circuitry is further configured to initiate usage of the calculated average delay for one or more of the following operations in the wireless communication network:
- operation administration and maintenance (OAM) performance observability, quality-of-service (QOS) verification for minimization of drive testing (MDT), and core network monitoring of radio access network (RAN) QoS.

* * * * *